United States Patent Office 3,141,509
Patented July 21, 1964.

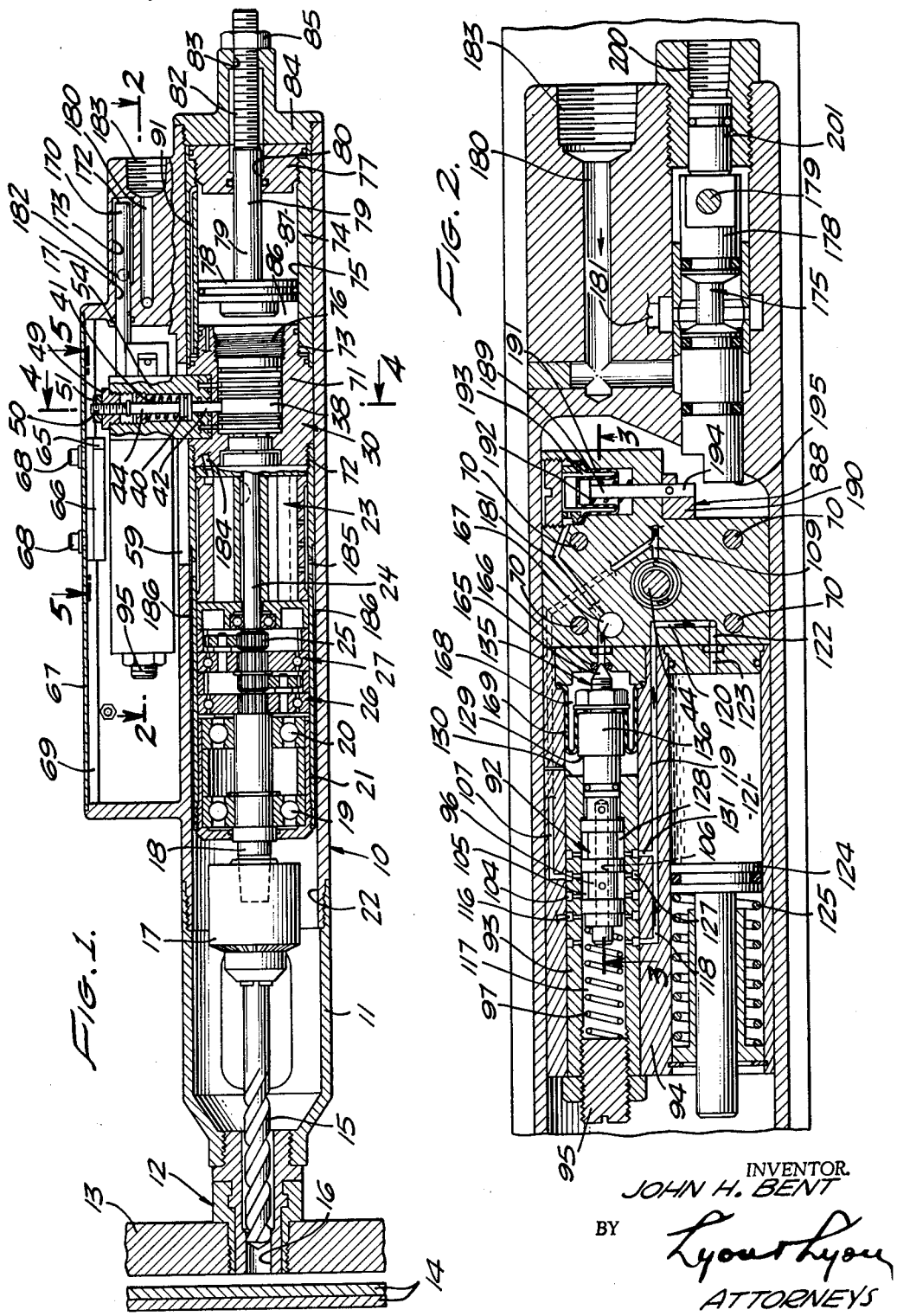

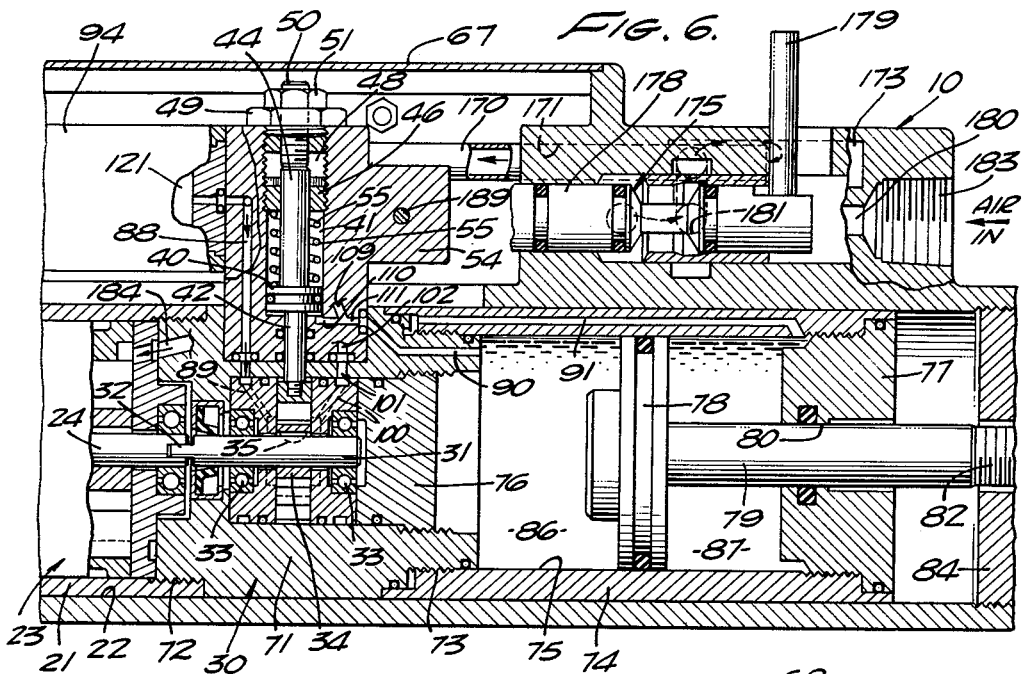
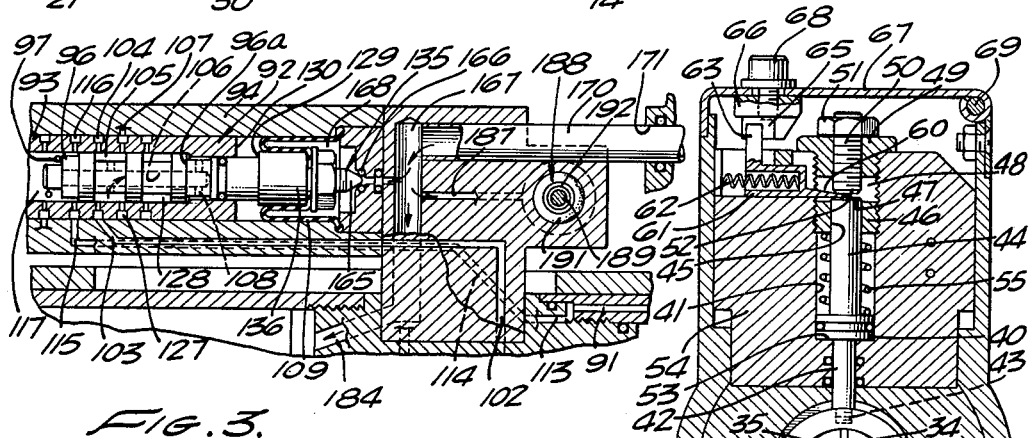
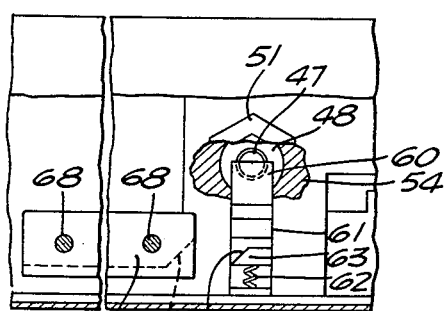

3,141,509
ROTARY TOOL WITH POWER FEED
John H. Bent, Fullerton, Calif., assignor to Standard Pneumatic Motor Company, Whittier, Calif., a corporation of California
Filed July 30, 1962, Ser. No. 213,371
13 Claims. (Cl. 173—19)

This invention relates to power tools for performing drilling and allied operations and is particularly directed to improvements in a mechanism for feeding and retracting the rotating tool with respect to the work.

In my prior patent, No. 2,869,403, granted January 20, 1959, for "Power Operated Tool With Fluid Pressure Actuated Positive Feed" there is shown a device of this same general type but having a lead screw and nut for positively advancing and retracting the tool with respect to the work. The present invention contemplates the use of hydraulic means for effecting feed and return of the tool, and is particularly concerned with a novel form of such device.

Among the objects of the present invention are to provide a rotary power tool having a positive feed so that for each revolution of the work-engaging element there is an accompanying axial movement of predetermined amount. Another object is to provide a positive feed tool of this type in which the positive feed is achieved by hydraulic means, and which preferably uses a positive displacement hydraulic pump driven by an air motor or an electric motor. A related object is to provide a light-weight positive power drill tool assembly of this type which is readily portable, so that it may be taken to the work rather than requiring that the work be brought to the tool. Another object is to provide a rotary power tool having hydraulic means for positive feed and which includes adjustable means for automatically changing the rate of feed for the approach, work-stroke, fast-return, and shut-off.

Other and more detailed objects and advantages will appear hereinafter.

In the drawings, FIGURE 1 is a sectional side elevation showing a preferred embodiment of this invention.

FIGURE 2 is a sectional plan view taken substantially on the lines 2—2 as shown in FIGURE 1.

FIGURE 3 is a sectional detail taken substantially on the lines 3—3 as shown in FIGURE 2.

FIGURE 4 is a transverse sectional elevation taken substantially on the lines 4—4 as shown in FIGURE 1.

FIGURE 5 is a sectional plan view partly broken away taken substantially on the lines 5—5 as shown in FIGURE 1.

FIGURE 6 is a sectional elevation showing a portion of FIGURE 1 on an enlarged scale.

Referring to the drawings, the housing generally designated 10 provides an enclosure for the working parts of the device. This housing carries a nose piece 11 and detachable connection assembly 12 for securing the housing to the support member 13. This support member 13 is fixed by means (not shown) with respect to the work pieces 14. A drill bit 15 passes through the guide bore 16 in the assemlby 12 for drilling a hole in the work pieces 14. The drill bit 15 may be carried by a conventional chuck 17 mounted on a rotary spindle 18.

The spindle 18 is rotatably supported on axially spaced bearings 19 and 20 which are mounted in the forward end of the carrier 21. This carrier 21 takes the form of an axially extending sleeve mounted to slide axially within the bore 22 of the housing 10. The spindle 18 projects from the forward end of the carrier 21. An air motor 23 of conventional form is mounted within the carrier 21 and is provided with a rotary shaft 24. The forward end of this shaft 24 carries a driving gear 25, and planetary gear sets 26 and 27 of the general type shown in my prior patent serve to provide a speed reducing connection whereby the air motor shaft 24 may rotate the spindle 18 at a lower speed.

A positive displacement hydraulic pump assembly generally designated 30 is fixed relative to the air motor and carrier 21 and is best shown in FIGURE 6. This hydraulic pump assembly 30 includes a rotary shaft 31 driven from the rearward end of the air motor shaft 24 by means of a driving connection 32. The pump shaft 31 is mounted on axially spaced bearings 33, and a rotor 34 is fixed on the shaft 31 between the bearings 33 by means of the key 35. The rotor 34 is provided with a plurality of vanes 36 which slide radially on the rotor 34 to engage within the cylindrical bore 37 of the eccentric ring 38. This pump construction is conventional.

Means are provided for shifting the eccentric ring 38 transversely of the pump shaft 31 in order to vary the rate of flow of hydraulic fluid from the pump assembly. As shown in the drawings, and particularly in FIGURE 4 thereof, this means includes a piston 40 mounted to slide in a cooperating cylinder 41, the piston being provided with a rod 42 connected to the eccentric ring 38 by means of threads 43. A stem 44 fixed to the piston 40 slides through the bore 45 of a guide plug 46 and the end 47 of this stem 44 projects into the space 48 between the guide plug 46 and the closure plug 49. An adjusting screw 50 is threaded into the closure plug 49 and is secured by a lock nut 51 to position the end 52 of the adjusting screw at the desired distance from the end 47 of the piston stem 44. When the end 47 of the stem 44 engages the end 52 of the adjusting screw 50 the eccentric ring 38 is positioned to cause minimum rate of delivery of hydraulic fluid from the pump 31. When the piston 40 engages the shoulder 53 of the block 54 under the action of the coil spring 55, the ring 38 is positioned at maximum eccentricity, and accordingly the rate of delivery of the pump 30 is at a maximum.

Means are provided for changing the degree of eccentricity of the ring 38 in order to change the rate of delivery of hydraulic fluid from pump 31, and as shown in the drawings this means includes a wedge element 60 which is positioned to move into the space between the end 47 of the plunger stem 44 and the end 52 of the adjusting screw 50. The wedge element 60 is carried on a laterally shiftable member 61 mounted on the block 54 and subjected to the force of the compression spring 62. A finger 63 projects upward from the slide member 61 and is provided with a beveled face 64 (FIGURE 5) which engages a similar beveled face 65 on a stationary bracket 66 secured to the cover 67 by threaded fastenings 68. This cover 67 is hinged at 69 to the housing 10 and forms a part thereof. From this description it will be understood that axial sliding movement of the block 54 within the housing 10 carries the member 61 with its trigger finger 63 along with it, and when the beveled surfaces 64 and 65 engage, the finger 63 and slide member 61 are moved laterally in a direction to compress the spring 62, thereby withdrawing the wedge element 60 from its position between the set screw 50 and the piston stem 44.

The block 54 is fixed to the pump body 71 by threaded fastenings 70 (FIGURE 2). The pump body 71 is connected by threads 72 to the carrier 21 and is connected by threads 73 to the cylindrical member 74. This member 74 has a bore 75 extending coaxially of the spindle 18. One end of this bore 75 is closed by the pump body 71 and the plug 76 while the other end is closed by the annular plug 77. The stationary piston 78 is slidably mounted within the bore 75 and the stationary piston rod 79 extends through bore 80 in the annular plug 77 in sliding relationship. As shown in FIGURE 1 the piston rod 79 has a threaded portion 82 extending through a threaded opening 83 in the flange 84 fixed to one end of the housing 10. The threads 82 and 83 provide a means of adjusting the axial position of the stationary piston 78 and this position may be fixed by means of the lock nut 85.

The stationary piston 78 and the moving cylinder member 74 cooperate to define chambers 86 and 87 within the bore 75 on opposite sides of the piston 78. Means are provided for delivering hydraulic fluid from the pump 30 into either chamber 86 or 87 in order to move the carrier 21 and its connected parts axially in either direction. Thus when hydraulic fluid under pressure is admitted into chamber 86, the carrier 21, spindle 18, etc. move to the left as viewed in the drawings. Similarly, when hydraulic fluid from the pump is delivered into the chamber 87 the spindle 18 and carrier 21 move to the right.

Passage 90 in the valve body 71 communicates with the chamber 86, and passage 91 in the cylindrical member 74 communicates with the chamber 87. The four way valve assembly generally designated 92 is best shown in FIGURES 2 and 3 and this assembly 92 includes a ported sleeve 93 pressed into the shell 94. The valve assembly 92 also includes the valve spool 96 having lands and grooves cooperating with the ports in the sleeve 93. A compression spring 97 acts to hold a valve spool 96 in the position shown in FIGURE 2, and the force of the spring may be changed by the screw 95. In this position hydraulic fluid enters the pump through passage 88 and inlet 89, and is delivered from the pump assembly 30 through passages 100, 101, 102 and through passage 103 into the annular space 104 in the ported sleeve 93. The hydraulic fluid then passes through radial ports into the space 105. The flow then divides and part of the hydraulic fluid enters bore 106 of the valve spool 96 and the remainder enters passage 107. Hydraulic fluid emerging from the ports 108 acts on the exposed area of the valve spool 96 to oppose the action of the coil spring 97. Hydraulic fluid entering the passage 107 flows through passage 109 and the flow again divides, one portion passes into the lower end of the cylindrical bore 41 below the piston 40 through port 110 (FIGURE 6) and the other portion flows through port 111 into the passage 90. Delivery of hydraulic fluid through passage 90 into chamber 86 causes the chamber 86 to enlarge and chamber 87 to diminish in size. Hydraulic fluid in chamber 87 escapes through passage 91 into port 113 and passage 114 and port 115 into annular space 116 in the ported member 93. When the valve spool 96 is in the position shown in FIGURES 2 and 3 the hydraulic fluid in annular space 116 is ported into the spring chamber 117 and then into port 118 and passages 119 and 120 into the reservoir 121 through aligned ports 122 and 123. A piston 124 loaded by a spring 125 serves to maintain the hydraulic fluid in the reservoir 121 under pressure.

When the valve spool 96 is shifted from its position shown in FIGURES 2 and 3, as described below, it moves against the force of the spring 97 to a position wherein the annular space 116 communicates with the annular space 105 and wherein the annular space 127 communicates with the annular space 128. In this position the shoulder 129 of the valve spool 96 engages the abutment 130 of the ported sleeve 93. In this latter position of the valve spool hydraulic fluid delivered by the pump 30 through passages 102 and 103 enters the annular space 105 and passes upward through port 115, passages 114 and 113 and through passage 91 into the chamber 87. At the same time hydraulic fluid in the chamber 86 is discharged through passages 90, 111, 109, 107, and into annular space 128 which now communicates through port 131 with the reservoir passage 119.

An air valve assembly 135 includes a moving valve element 136 fixed on the valve spool 96 and cooperating with a stationary valve seat formed by a rubber O-ring 166. Air under pressure in the cavity 167 is blocked when the valve head 165 engages the valve seat 166, but when the valve spool 96 is shifted by oil pressure as described below, the spool 96 is moved against the action of the spring, thereby permitting air to pass through the valve seat 166 into the enlarged cavity 168. A rolling diaphragm 169 forms a seal for this space 168 and the effective area is so great that, once the valve assembly 135 is open, the air pressure promptly moves the shoulders 129 and 130 into engagement, thereby maintaining the spool valve 96 in its second position.

As shown in FIGURE 3, air reaches the cavity 167 through the supply tube 170 which is fixed relative to the member 94 and which slides through the opening 171 provided in housing 10. The open end 172 (FIGURE 1) of the tube 170 communicates with the cavity 173 formed in the housing, which cavity receives air under pressure from the air valve assembly generally designated 175. This assembly includes a plunger 178 manually movable by means of the laterally projecting pin 179 to connect the air supply passage 180 with the passage 181 leading to the cavity 173. An air supply hose (not shown) is connected to the threaded port 183 and air flows through the passage 180 and into passage 181 when the valve 175 is shifted from the position shown in FIGURE 2 to the position shown in FIGURE 6. Air delivery to the cavity 167 from the supply tube 170 also passes through port 184 into the air motor 23. Air discharged from the air motor passes through ports 185 and into the longitudinal slots 186 between the carrier 21 and the bore 22 of the housing 10, to escape to atmosphere.

Air from the cavity 167 also passes through passage 187 to operate the shut-off plunger assembly 188 (FIGURE 2). A plunger 189 carries a lug 190 on its projecting end and this plunger is actuated by air pressure acting on the rolling diaphragm 191 against the action of the coil spring 192. When air pressure exists in the space 193, the plunger 189 is projected to carry the lug 190 into a position in which the face 194 is aligned for contact with face 195 on the air valve 175.

In operation, the housing 10 is supported on the member 13 by means of the assembly 12 and an air hose, not shown, is connected to the air inlet port 183. The air valve 175 is then opened by manually moving the pin 179 forward from the position shown in FIGURE 2 to the position shown in FIGURE 6. Opening of the air valve 175 can also be accomplished by connecting another air hose to the fitting 200 in order to cause the plunger 201 to move forward and shift the valve 175. In this way, the air valve may be remotely operated, if desired. Air under pressure then passes through passage 181 and port 182 into the cavity 173 and then through the interior of the tube 170 into the cavity 167. From the cavity 167 the air acts through the interior of the valve seat 166 against the valve head 165, but the very small effective area of the seat does not permit sufficient build-up in force to move the valve spool 92 against the action of the spring 97.

Air pressure in the cavity 167 is also admitted through passage 187 to the space 193 above the plunger 189, thereby acting to move it downward against the force of the spring 192. The plunger 189 remains in its lower position so long as air pressure is supplied.

The air supply to the air motor 23 causes its shaft 24 to turn and to drive the planetary gear sets 27 and 26 and thereby rotate the spindle 18, chuck 17 and drill bit 15. Rotation of the air motor shaft 24 also drives the pump shaft 31 and its rotor 34. Hydraulic fluid from the reservoir 121 passes through ports 81 and passage 88 into the pump inlet port 89. Hydraulic fluid under pressure delivered by the pump through outlet passage 100 then passes through the four-way valve 92 and into the expansible chamber 86. Since the piston 78 is stationary, the cylindrical member 74, pump body 71 and carrier 21 all move to the left as a unit carrying the rotary spindle 18. The slot 59 in the housing provides clearance for the axially moving parts. Hydraulic fluid in the chamber 87 is discharged through the four-way valve 92 and back into the reservoir 121 through port 123.

The initial axial movement of the carrier 21 to the left is at a relatively high rate of speed, to conserve time as the bit 15 approaches the work 14. At about the time that the bit 15 engages the work 14 the wedge element 60 is withdrawn laterally against the action of the spring 62 by the engagement of the surfaces 64 and 65 on the finger 63 and lug 66 respectively. The piston 40 then moves upward against the force of the spring 55 under the force generated by pressure of hydraulic fluid admitted through passage 109 and port 110. This upward movement of the piston 40 moves the eccentric ring 38 of the pump to reduce the stroke of the pump and thereby slow down the rate of feed of the carrier 21 and spindle 18. The wedge element 60 remains in its retracted position for the full working stroke of the carrier 21.

When the annular plug 77 strikes the stationary piston 78 at the end of the axial travel of the carrier 21, the pressure rises in the chamber 86 and this is reflected back through the passages 90, 109, 107 and through the interior of the spool 96 and out through ports 108. This increase in pressure acts on the exposed area of the shoulder 96A and this shifts the valve spool 96 against the force of the spring 97, thereby changing the porting and causing the outlet port 100 of the pump 30 to deliver hydraulic fluid under pressure into the chamber 87 and to permit it to be expelled from the chamber 86 back into the reservoir 121. When the valve spool 96 shifts to the left, the air valve 136 opens to allow air under pressure to enter the enlarged chamber 168 and thereby develop a force holding the valve spool 96 in shifted position until the supply of air is cut off. The return stroke of the carrier 21 and spindle 18 occurs under the high rate of feed because the spring 55 moves the piston 40 and rod 42 downward to bring the ring 38 into its position of maximum eccentricity, the pressure at the port 110 below the piston 40 being equal only to exhaust pressure from the chamber 86.

As the carrier 21 returns toward starting position, the surface 194 engages the forward end 195 of the air valve 175 and shifts it to the right to the closed position shown in FIGURE 6. This shuts off the supply of air to the air motor, and the pump and the spindle 18 comes to rest. Air remaining in the system bleeds out through the air motor passages permitting the valve 135 to close and allowing the plunger 188 to be withdrawn laterally under force of the spring 192. The cycle repeats upon opening of the air valve 175.

The planetary gear sets 26 and 27 may be replaced if it is desired to change the speed ratio between the air motor shaft 24 and the spindle 18.

Having fully described my invention, it is to be understood that I am not to be limited to the details herein set forth, that my invention is of the full scope of the appended claims.

I claim:
1. In a rotary power tool assembly, the combination of: a housing, a cylindrical carrier mounted for axial movement in the housing, a spindle rotatably mounted axially on the carrier, a motor mounted concentrically within the carrier for movement axially with said carrier, means whereby the motor may rotate said spindle, a positive displacement hydraulic pump mounted concentrically with and driven by said motor and connected for axial movement therewith, a cylinder element extending axially of said carrier, a piston element slidably mounted within said cylinder element and cooperating therewith to define chambers on opposite sides of said piston element, means connecting one of said elements to said housing and the other of said elements to said carrier, and means for delivering the output of said hydraulic pump into either of said chambers to cause axial movement of said spindle in either direction relative to said housing.

2. In a rotary power tool assembly, the combination of: a housing, a cylindrical carrier mounted for axial movement in the housing, a rotary spindle projecting axially from one end of the carrier, bearings in the carrier supporting said spindle, a motor mounted concentrically within the carrier for movement axially with said carrier, means whereby the motor may rotate said spindle, a positive displacement hydraulic pump mounted concentrically with and driven by said motor and connected for axial movement therewith, a cylinder element extending axially of said carrier, a piston element slidably mounted within said cylinder element and cooperating therewith to define chambers on opposite sides of said piston element, means connecting one of said elements to said housing and the other of said elements to said carrier, and means for delivering the output of said hydraulic pump into either of said chambers to cause axial movement of said spindle in either direction relative to said housing.

3. In a rotary power tool assembly, the combination of: a housing, a cylindrical carrier mounted for axial movement in the housing, a rotary spindle projecting axially from one end of the carrier, bearings in the carrier supporting said spindle, a motor mounted concentrically within the carrier for movement axially with said carrier, gear means within the carrier whereby the motor may rotate said spindle at reduced speed, a positive displacement hydraulic pump mounted concentrically with and driven by said motor and connected for axial movement therewith, a cylinder element extending axially of said carrier, a piston element slidably mounted within said cylinder element and cooperating therewith to define chambers on opposite sides of said piston element, means connecting one of said elements to said housing and the other of said elements to said carrier, and means for delivering the output of said hydraulic pump into either of said chambers to cause axial movement of said spindle in either direction relative to said housing.

4. In a rotary power tool assembly, the combination of: a housing, a cylindrical carrier mounted for axial movement in the housing, a spindle rotatably mounted axially on the carrier, a motor mounted concentrically within the carrier for movement axially with said carrier, means whereby the motor may rotate said spindle, a positive displacement hydraulic pump mounted concentrically with and driven by said motor and connected for axial movement therewith, a cylinder element extending axially of said carrier and secured relative to said carrier, a piston element secured relative to said housing and slidably mounted within said cylinder element to define chambers on opposite sides of said piston element, and means including a four way valve for delivering the output of said hydraulic pump into either of said chambers to cause axial movement of said spindle in either direction relative to said housing.

5. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, and means for changing the stroke of said pump as a consequence of predetermined axial travel of said carrier.

6. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, a movable member operable to change the stroke of said pump, and means responsive to predetermined axial travel of said carrier for actuating said movable member to reduce the stroke of said pump.

7. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, a movable member operable to change the stroke of said pump, an adjustable stop adjacent one end of said member, a wedge element insertable between the end of said movable member and said adjustable member, and means responsive to predetermined axial travel of said carrier for withdrawing said wedge element to reduce the stroke of said pump.

8. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, a movable member connected to the pump for changing the effective stroke thereof, bias means acting on said member in a direction to increase the effective stroke of the pump, an element adapted to engage said movable member to maintain the effective stroke of the pump at a maximum, and means responsive to predetermined axial travel of said carrier for moving said element to an inoperative position.

9. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, a movable member connected to the pump for changing the effective stroke thereof, bias means acting on said member in a direction to increase the effective stroke of the pump, and means responsive to hydraulic pressure in said chamber opposing the action of said bias means.

10. In a rotary power tool assembly, the combination of: a housing, a carrier mounted for axial movement on the housing, a spindle rotatably mounted axially on the carrier, a motor mounted to move axially with said carrier, means whereby the motor may rotate said spindle, a variable stroke positive displacement hydraulic pump driven by said motor and connected for axial movement therewith, a cylinder element, a piston element slidably mounted within said cylinder element and cooperating therewith to form an expansible chamber, means connecting one of said elements to said housing and the other of said elements to said carrier, means for delivering fluid from said hydraulic pump to said chamber to cause axial movement of said spindle relative to said housing, a movable member connected to the pump for changing the effective stroke thereof, bias means acting on said member in a direction to increase the effective stroke of the pump, means responsive to hydraulic pressure in said chamber opposing the action of said bias means, an element adapted to engage said movable member to maintain the effective stroke of the pump at a maximum, and means responsive to predetermined axial travel of said carrier for moving said element to an inoperative position.

11. In a rotary power tool assembly, the combination of: a housing, a cylindrical carrier mounted for axial movement in the housing, a spindle rotatably mounted axially on the carrier, an air motor mounted concentrically within the carrier for movement axially with said carrier, means whereby the air motor may rotate said spindle, a positive displacement hydraulic pump mounted concentrically with and driven by said air motor and connected for axial movement therewith, a cylinder element extending axially of said carrier, a piston element slidably mounted within said cylinder element and cooperating therewith to form two expansible chambers, means connecting one of said elements to said housing and the other of said elements to said carrier, means including a four way valve assembly for delivering fluid from said hydraulic pump to either chamber to cause axial movement of said carrier and spindle relative to said housing in either direction, said valve assembly having a spool shiftable within a ported sleeve, hydraulic means for shifting the spool after predetermined travel of said carrier and spindle, and air-operated means for maintaining said spool in shifted position.

12. In a rotary power tool assembly, the combination of: a housing, a carrier mounted for axial movement on the housing, a spindle rotatably mounted axially on the carrier, an air motor mounted to move axially with said carrier, means whereby the air motor may rotate said spindle, a variable stroke positive displacement hydraulic pump driven by said air motor and connected for axial movement therewith, a cylinder element secured relative to said carrier, a piston element adjustably fixed to the housing and slidably mounted within said cylinder element, said elements cooperating to form two expansible chambers, means for delivering fluid from said hydraulic pump to either chamber to cause axial movement of said carrier and spindle relative to said housing in either direction, said valve assembly having a spool shiftable within a ported sleeve, hydraulic means for shifting the spool after predetermined travel of said carrier and spindle, and air-operated means for maintaining said spool in shifted position.

13. In a rotary power tool assembly, the combination of: a housing, a cylindrical carrier mounted for axial movement within the housing, a spindle rotatably mounted in the carrier near one end thereof, a positive displacement hydraulic pump connected to the other end of the carrier, a motor mounted concentrically within said carrier between said spindle and said pump, means whereby said motor may drive both the spindle and said pump, a cylinder element fixed to said pump and extending axially of said carrier, a piston element fixed relative to said housing and co-operating with the cylinder element to define chambers on opposite sides of said piston element, means including a four-way valve for delivering the output of said pump into either of said chambers, a movable member operable to change the stroke of said pump, and means responsive to predetermined axial travel of said carrier for actuating said movable member.

References Cited in the file of this patent

UNITED STATES PATENTS

| | | |
|---|---|---|
| 2,026,776 | Douglas | Jan. 7, 1936 |
| 2,108,780 | Schauer et al. | Feb. 15, 1938 |
| 2,869,403 | Bent | Jan. 20, 1959 |